United States Patent [19]

Van Rosmalen

[11] Patent Number: 5,802,033
[45] Date of Patent: Sep. 1, 1998

[54] OPTICAL APPARATUS FOR SCANNING A TAPE-SHAPED RECORD CARRIER

[75] Inventor: Gerard E. Van Rosmalen, Eindhoven, Netherlands

[73] Assignee: U.S. Philips Corporation, New York, N.Y.

[21] Appl. No.: 757,533

[22] Filed: Nov. 27, 1996

[30] Foreign Application Priority Data

Nov. 27, 1995 [EP] European Pat. Off. .............. 95203253

[51] Int. Cl.$^6$ ....................................................... G11B 3/74
[52] U.S. Cl. ........................................ 369/97; 369/14
[58] Field of Search ............................... 369/95, 96, 97, 369/14; 360/93, 134, 132, 90

[56] References Cited

U.S. PATENT DOCUMENTS

| | | | |
|---|---|---|---|
| 4,223,347 | 9/1980 | Bouwhuis et al. | 358/128.5 |
| 4,358,200 | 11/1982 | Heemskerk et al. | 356/123 |
| 4,665,310 | 5/1987 | Heemskerk | 250/201 |
| 4,901,297 | 2/1990 | Komatsu et al. | 369/13 |
| 5,140,566 | 8/1992 | Kang et al. | 369/13 |
| 5,171,984 | 12/1992 | Van Rosmalen | 250/236 |
| 5,245,182 | 9/1993 | Van Rosmalen et al. | 250/236 |
| 5,321,683 | 6/1994 | Olczak | 369/95 |
| 5,544,133 | 8/1996 | Sin | 369/14 |
| 5,548,114 | 8/1996 | Van Rosmalen et al. | 369/97 |

OTHER PUBLICATIONS

"A Compact Optical Tape Recording System" in: SPIE. vol. 2338. Optical Data Storage 1994, pp. 8–14. (No Month Available).

*Primary Examiner*—Tan Dinh
*Attorney, Agent, or Firm*—Michael E. Belk

[57] ABSTRACT

An optical apparatus for scanning a tape-shaped record carrier, which apparatus uses a mirror polygon for scanning tracks extending perpendicularly to the tape travel direction. Since at least one facet, or a part thereof, of the mirror polygon extends at a different angle to the axis of rotation, the scanning spot is periodically moved transversely to the track direction, so that a tracking signal can be generated.

4 Claims, 4 Drawing Sheets

OPTICAL APPARATUS FOR SCANNING A TAPE-SHAPED RECORD CARRIER

BACKGROUND OF THE INVENTION

The invention relates to an optical apparatus for scanning a tape-shaped record carrier intended for recording a structure of optically detectable information areas which are arranged in information tracks extending transversely to the longitudinal direction of the tape. The apparatus includes a supply reel and a take-up reel for transporting the record carrier in a first direction, and a scanning device supplying a scanning spot for scanning the record carrier in a second direction transverse to the first direction. The scanning device is provided with a rotatable mirror polygon having mirror facets which are arranged around its circumference and provides a scanning movement of the scanning spot.

Since the introduction of the digital optical recording technique, there has been an increasing need to increase the storage capacity of the medium used, so that, for example, a digital video signal can be stored on such a medium. In the known digital audio disc, or compact disc (CD) and the media derived therefrom, such as CD-ROM, CD-I, etc., the storage capacity is determined by the size of the scanning spot formed in the information plane of the record carrier, which spot determines the resolving power of the scanning device and hence the minimal dimensions of the information details, for example, information pits which can still be detected separately. It is true that the size of the spot can be reduced by decreasing the wavelength of the read beam used and/or by increasing the numerical aperture of the objective system with which the spot is formed, but this does not lead to an increase of the storage capacity by a factor of ten or more.

As described in the article: "A Compact Optical Tape Recording System" in: SPIE, Vol. 2338, Optical Data Storage 1994, pp. 8–14, the storage capacity and the write speed can be increased by several orders of magnitude, while maintaining the usual spot size, by making use of a tape-shaped record carrier which, viewed in its longitudinal direction, is moved along an optical scanning device, and in which the information is provided in information tracks extending in a direction perpendicular to the longitudinal direction of the tape. To write and/or read these information tracks, the scanning device includes a mirror polygon having, for example, six mirror faces, or facets. Upon rotation of the mirror polygon, each mirror facet successively ensures that an information track is scanned, i.e. written or read.

It should then be ensured that the spot accurately follows the instantaneously scanned track when the recorded information is being read. To this end, a tracking error signal must be generated, so that the position of the center of the spot with respect to the centerline of the scanned track can be corrected by means of this signal, for example, by adapting the angle between the axis of rotation of the mirror polygon and the optical axis of an objective lens arranged between the polygon and the tape, or by adapting the orientation of an extra mirror incorporated in the radiation path of the scanning beam.

A disc-shaped optical record carrier is known from, for example, U.S. Pat. No. 4,223,347, in which the information tracks have a periodical excursion with respect to the average centerline of such a track. By filtering a low-frequency component from the detector signal when reading such an information track, and by comparing the frequency and phase of this signal with those of a reference signal, it can be determined whether the center of the read spot coincides or does not coincide with the average centerline of the instantaneously scanned information track.

To obtain such a track excursion, whose amplitude is a fraction of the track width, a mirror which is tiltable through a small angle may be arranged in the radiation path of the scanning beam, which mirror periodically moves the read spot transversely to the track direction. When such a mirror is used in a tape-scanning apparatus, in which the frequency at which the write spot is periodically displaced should be of the order of 10 kHz to have a sufficient control bandwidth, there will be the problem that the quantity of energy which would be required for realizing this periodical displacement is relatively large. Another possibility of realizing the periodical displacement of the radiation spot is to make use of an acousto-optical modulator. However, such a modulator is expensive and requires a high control voltage.

SUMMARY OF THE INVENTION

It is an object of the invention to provide an optical tape-scanning apparatus in which said periodical displacement of the scanning spot is realized in a very simple manner and without extra moving means. To this end, this tape-scanning apparatus is characterized in that the facet structure of the mirror polygon is adapted to periodically displace a radiation spot in the first direction for the purpose of generating a tracking signal.

In the apparatus according to the invention, the rotation of the mirror polygon intended for scanning the information tracks is also used to periodically displace the radiation spot transversely to the track direction, so that a separate, adjustable element and a driving device for this element are no longer required.

A first embodiment of the apparatus is further characterized in that the mirror facets alternately extend at a first angle and a second angle to the axis of rotation of the mirror polygon, the difference between the first and the second angle being such that the resultant displacement of the scanning spot in the first direction is a fraction of the width of the information tracks.

By starting from a mirror polygon whose facets extend at, for example, an angle of 45° to the axis of rotation of this mirror polygon, the radiation spot can be displaced through a fraction of the track width by causing, for example, all facets having an odd ordinal number to extend at an angle of 45°+θ or 45°−θ, in which θ is, for example, of the order of 10 μrad, to the axis of rotation.

If the invention is used for reading a pre-recorded optical tape, the center of the read spot is positioned periodically, that is, whenever a facet having an odd ordinal number is present in the read beam, slightly beside the centerline of an information track which has been read. The beam from the record carrier is then not only modulated with the high-frequency read information but also modulated with a lower frequency giving an indication about the position of the radiation spot with respect to the track. By synchronous detection of the low-frequency signal component with a signal representing the movement of the mirror polygon, the tracking signal is obtained.

A record carrier may also be written when the first embodiment of the apparatus is used. The individual information tracks of the written record carrier are then alternately displaced to the left and right with respect to the average centerline of all tracks imaginarily arranged one behind the other.

This record carrier can be read by means of the same apparatus by ensuring that a track written with a facet having an odd or even ordinal number is read via a facet having an even or odd ordinal number, respectively, i.e. by displacing the radiation spot through a distance which is equal to the track period, when changing from the write mode to the read mode. Then, the periodical displacement of the read spot is doubled with respect to the track to be read, so that the amplitude of the tracking signal is doubled.

A second embodiment of the apparatus according to the invention is characterized in that, as compared with the other mirror facets, at least a part of at least one mirror facet extends at such a different angle to the axis of rotation of the mirror polygon that the displacement of radiation, caused by the angular difference, from said facet part is approximately equal to the period of the information track structure.

If the facet having the deviating angle is rotated in the radiation path of the beam, the scanning spot jumps to the previous track and the correct position of the spot with respect to the last-mentioned track can be detected, so that the position of the spot can be corrected, if necessary. A full facet may be used for this position detection. This facet is then no longer available for the actual scanning operation. However, only a part of a facet is preferably used for the position detection, so that the rest of this facet is available for the actual scanning operation. When using a mirror polygon having six facets, one of which has a deviating tilt angle, it is assumed that the tracking error possibly occurring during scanning of the subsequent five tracks remains acceptable if the radiation spot is correctly positioned with respect to the track to which it has jumped back. An accurate control is possible if a plurality of facets, or parts thereof, are given a different tilt angle.

An advantage of the second embodiment is that, without any further measures, it is suitable for writing and reading the tape-shaped record carrier.

These and other aspects of the invention will be apparent from and elucidated with reference to the embodiments described hereinafter.

DESCRIPTION OF THE PREFERRED EMBODIMENTS

Figure 1:
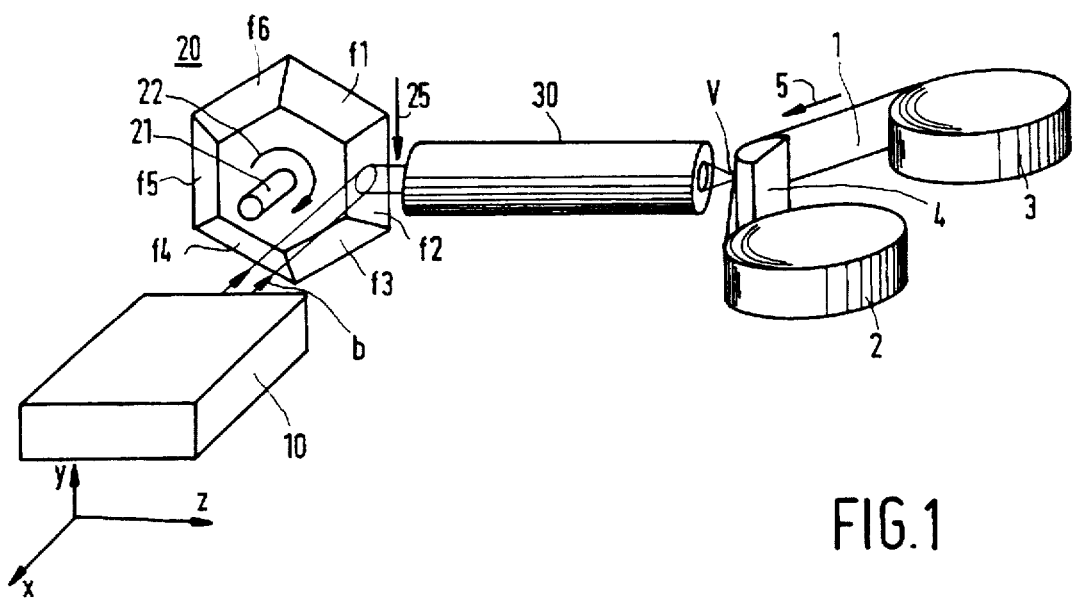
FIG. 1 shows the circuit diagram of an optical tape-scanning apparatus.

In FIG. 1, the reference numeral I denotes a tape-shaped record carrier. This tape is directly transported from a supply reel 3 to a take-up reel 2 via a fixed tape-guiding element 4.

The apparatus does not need to have any further tape-guiding elements. Both reels are driven by separate motors. The motors may be controlled in such a way that the tape tension remains constant. The tape travel direction is denoted by the arrow 5.

The scanning device of the apparatus comprises a radiation source detection unit 10 which supplies a scanning beam b, a rotating mirror polygon which reflects the, for example parallel, beam to an objective lens 30 which focuses the beam to a radiation spot V on the tape. The mirror polygon comprises, for example, six mirror facets $f_1-f_6$ and rotates during operation about the shaft 21 in the direction of the arrow 22. Each facet rotating in the radiation path of the beam b, facet $f_2$ in the Figure, will move the beam in the direction of the arrow 25, perpendicularly to the tape travel direction 5, across the entrance pupil of the objective lens. The radiation spot formed by this lens then scans a track extending in the direction perpendicular to the direction 5. A second, a third, etc. track are then consecutively scanned by means of the facets $f_1$, $f_6$, etc.

The objective lens has, for example, an image field with a diameter of 1 mm and a numerical aperture of 0.45. With such a lens, 1,600 separate information areas can be written into or read from a track. The speed at which writing or reading can take place is determined by the rotation frequency of the mirror polygon. If, for example, a bitrate of 30 Mbits is desired, the six-facet polygon should rotate at a frequency of 3,000 Hz. It has been shown that such a frequency is feasible and that a mirror polygon having a maximum diameter of, for example, 8 mm and facet tilt angles of approximately 45° is manufacturable.

The mirror polygon is electro-magnetically journaled and electro-magnetically driven. The position of the polygon in five degrees of freedom is continuously detected by means of a measuring beam and an optical detection system as described in U.S. Pat. No. 5,245,182 whose contents are herein incorporated by reference. The five degrees of freedom are: the displacements along three mutually perpendicular axes X, Y, Z and the rotations about the X and Y axes. The sixth degree of freedom is the rotation of the mirror polygon about the Z axis and is thus used for scanning the information tracks. The construction of the journaling and drive system of the polygon is described in U.S. Pat. No. 5,171,984 whose contents are herein incorporated by reference.

Figure 2:
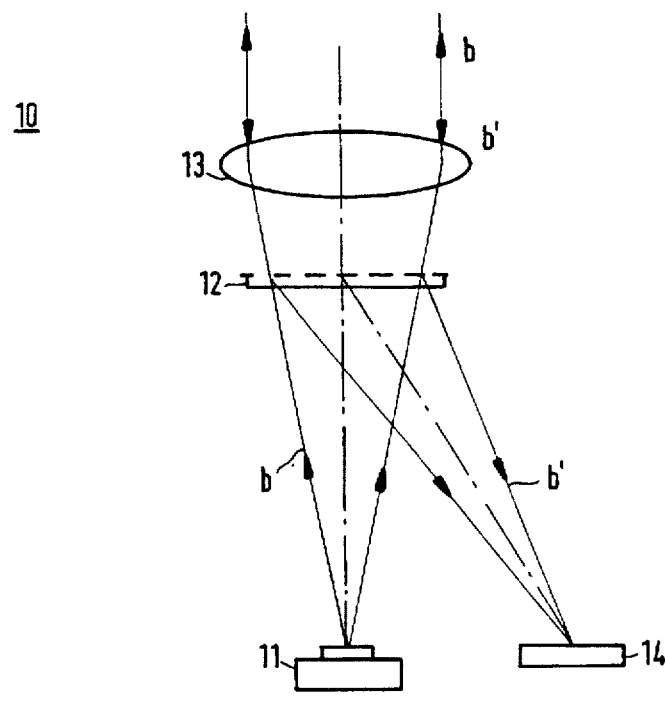
FIG. 2 shows an embodiment of a radiation source detection unit used in this apparatus.

FIG. 2 shows a possible embodiment of the radiation source detection unit 10. This unit comprises a radiation source 11 in the form of a diode laser supplying a diverging beam b. This beam is converted by a collimator lens 13 into a parallel beam which is directed onto the mirror polygon. To separate the beam b' reflected by the record carrier from the on-going beam, which reflected beam b' enters the collimator lens 13 again after a second passage through the objective lens and a second reflection on the mirror polygon, the unit is provided in known manner with a diffraction grating 12 having such a blaze that it diffracts a large part of the radiation of the returning beam in the first diffraction order to a detector 14. An image V' of the radiation spot V is formed on this detector. Blaze is herein understood to mean that the walls of the grating grooves have such an inclination that the angle at which a ray is refracted by such a wall is equal to the angle at which a ray diffracted in the first diffraction order leaves the grating. As described in, inter alia, U.S. Pat. No. 4,665,310, the grating may be divided into two halves, in which halves the grating strips have different directions. Then the beam b' is divided into two sub-beams and a focus error signal can be generated by means of a detector which comprises a separate pair of detector elements for each sub-beam, which focus error signal is a signal indicating whether the focal point of the objective lens is located or not located in the plane of the scanned track on the tape.

Such a signal may also be obtained by using an undivided grating, whose grating period has a non-linear variation, in combination with a four-quadrant detector as described in U.S. Pat. No. 4,358,200. This grating renders the beam astigmatic and the shape of the radiation spot on the detector, which shape is dependent on the extent to which the beam b is focused on the tape, can be determined by means of the four-quadrant detector.

The on-going and returning beams may not only be separated by means of a grating, but also by means of a semi-transparent mirror or by means of the combination of a polarization-sensitive beam splitter and a λ/4 plate arranged between the beam splitter and the objective lens, in which λ is the wavelength of the scanning beam.

The distance between the objective lens and the tape at the location of the guiding element 4 can be adjusted by means of the focus error signal. To this end, the objective lens may be arranged in an actuator which can move this lens into the Z direction, or the guiding element may be provided with an actuator which can move this element into the Z direction.

The objective lens has a length of, for example 40 mm and a diameter of, for example 12 mm. This lens is designed, for example, for a wavelength of 780 nm and has a numerical aperture of 0.45 and a focal length of 125 mm. The lens is of the fθ type and has a field diameter of, for example, 1 mm and then accepts 44° of the 60° scanning arc length supplied per mirror facet. In the combination of a wavelength of 780 nm and a numerical aperture of 0.45, a spot V having a diameter of the order of 1 μm is formed, so that an information density of the order of 1 μm/bit can be achieved. An 8 mm wide tape having a length of 110 m, i.e. a surface area of the order of 0.88 m, may then comprise 110 Gbyte.

At a rotation frequency of 3,000 Hz, the field diameter of 1 mm is scanned in 41 μsec, so that the linear speed along the tracks is 23.5 m/sec. At a track period of 1.6 μm, the tape speed is 2.88 cm/sec.

Figure 3:
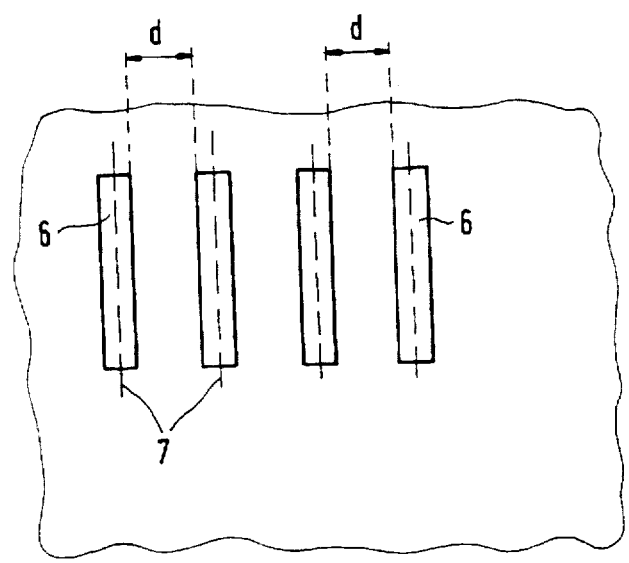
FIG. 3 shows the position of the average centerline of the tracks in a known optical tape.

In the apparatus shown in FIG. 1, all facets have the same tilt angle. The distance between the information tracks on the tape is then constant, as is shown in FIG. 3. This Figure shows a small part of the tape with only some information tracks 6. The distance between the tracks is d. The broken line 7 denotes the imaginary average centerline of all tracks if these tracks were arranged one behind the other instead of next to each other. For the tape with a constant distance d, the average centerline for all tracks is situated in the center of a track.

If the first embodiment of the apparatus according to the invention is used for writing the record carrier, a tape is obtained whose information tracks are alternately slightly offset with respect to the original tracks in FIG. 3.

Figure 4:
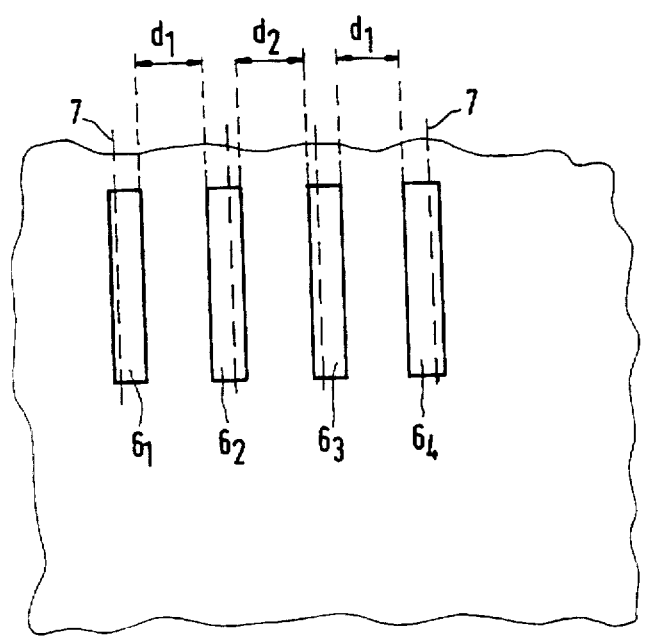
FIGS. 4 and 5 show this position in a tape written by means of the apparatus according to the invention.

FIG. 4 shows a small part of the record carrier thus obtained. The information tracks having an odd ordinal number $6_1, 6_3$ are offset to the right with respect to those in FIG. 3, while the tracks $6_2, 6_4$ having an even ordinal number have the same position as those in FIG. 3. The average centerline of all the tracks combined is no longer situated in the center of the tracks but is shifted to the left for the tracks of the odd ordinal numbers and to the right for the tracks of the even ordinal numbers, as is shown in FIG. 4.

Figure 5:
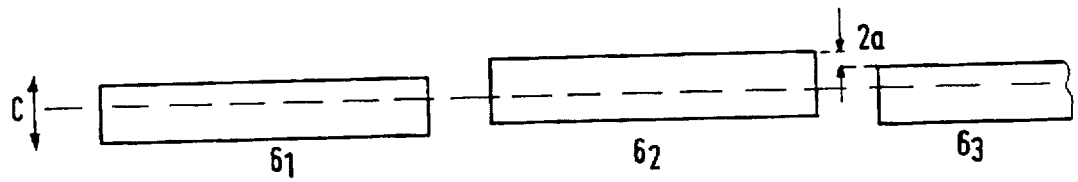

If the tracks are imagined to be arranged one behind the other, as is shown in FIG. 5, these tracks are alternately offset in opposite directions with respect to the centerline 7. Thus, a periodical excursion having an amplitude a which is fraction of the track width c is realized for all tracks combined. This amplitude is, for example, 75 nm at a tilt angle difference of 10 μrad.

If a record carrier in acordance with FIG. 4 is being read, the tracking servosystem is adapted in such a way that the read spot continues to follow the centerline 7. Due to the offset of the successive information tracks, the signal from the detector 14 is modulated at a frequency which is much lower than the frequency of the information signal. The detector signal component having the lower frequency can be processed in a manner analogous to that described in U.S. Pat. No. 4,223,347. This component is filtered and compared with a reference signal which has a frequency which is equal to the frequency of the succession of tracks. If no tracking error occurs, the frequency of said component having the lower frequency is equal to twice that of the reference signal. If a tracking error occurs, said component has a frequency which is equal to that of the reference signal. The phase of the low-frequency component with respect to that of the reference signal provides the sign of the tracking error.

Figure 6:
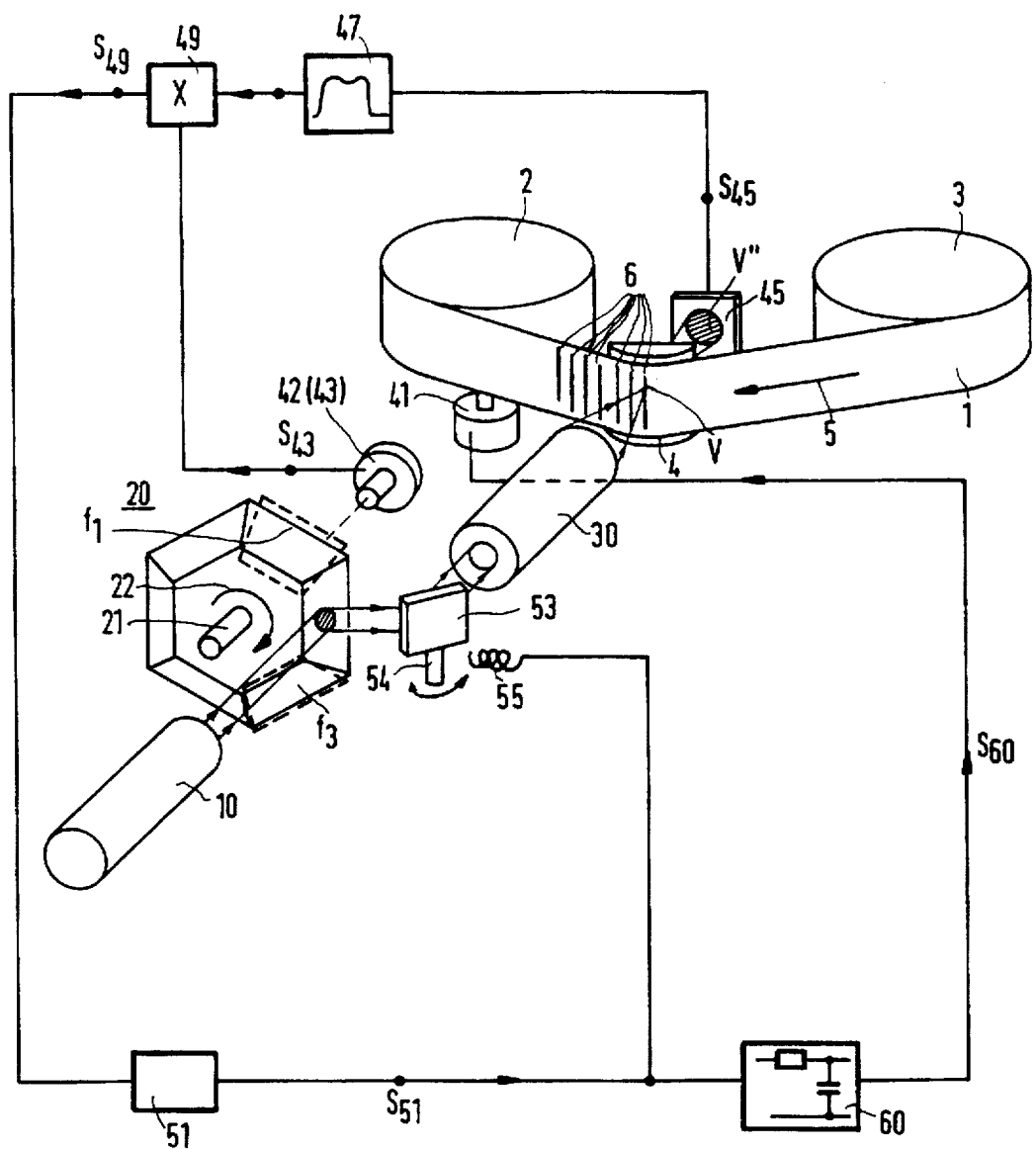
FIG. 6 shows an embodiment of the apparatus including a mirror polygon whose facets alternately have a first and a second tilt angle.

FIG. 6 shows the scanning apparatus according to the invention in greater detail. In addition to the tape 1, supply reel 3, take-up reel 2, tape-guiding element 4, radiation source detection unit 10, polygon mirror 20 and objective lens 30 already shown in FIG. 1, this Figure also shows a motor 41 for the take-up reel and a motor 42 for the mirror polygon which is provided with a tacho 43. As is shown by way of broken lines for the facets $f_1$ and $f_3$, the odd-numbered facets have a different tilt angle than the even-numbered facets, so that upon rotation of the mirror polygon and at each transition from an even facet to an odd facet, the radiation spot V moves through a distance which is a fraction of the width of the, diagrammatically shown, tracks 6 in the tape travel direction.

FIG. 6 shows the use of the apparatus as a read apparatus for a pre-recorded tape. This Figure also shows the tracking servoloop. The Figure also shows another possiblity of detecting a tracking error. Insted of deriving the tracking error from the beam b' reflected towards the radiation source detection unit, as described with reference to FIGS. 1 and 2, the tracking error may alternatively be derived from a beam portion passed by the tape. To this end, the guiding element 4 is implemented in a transparent material, such as a transparent plastic, and a radiation-sensitive detector 45 is arranged behind this element. When the tape is being scanned, the intensity of the radiation incident on the detector, and hence the output signal $S_{45}$ of the detector, varies. This signal comprises a component having a frequency which is equal to the frequency at which the read spot moves, hence at the rotation frequency of the mirror polygon. The signal $S_{45}$ is applied to a bandpass filter 47 which passes only a signal $S_{47}$ of said frequency. This signal is applied to a multiplier circuit 49 to which also a signal $S_{43}$ from the motor tacho 43 is applied. The tracking signal $S_{49}$ thus obtained is applied to a control circuit 51 in which a control signal $S_{51}$ is formed for the drive 55, shown diagrammatically, of a mirror 53 which is rotatable about a shaft 54. By rotating the mirror 53, the position, in the tape travel direction, of the read spot V can be corrected.

A DC component $S_{60}$, which is also a measure of the average excursion of the mirror 53, can be filtered from the signal $S_{51}$ by means of a low-pass filter 60. The signal $S_{60}$ is applied to the motor 41, so that the tape can be displaced in such a way that the radiation spot V is situated in the center of a track, while the mirror is in its central position.

In this way, a coarser control is realized in addition to a fine control by means of the mirror 53. Instead of using a mirror 53, the position of the scanning spot may alternatively be corrected in other known manners, for example, by tilting the mirror polygon.

The apparatus shown in FIG. 6 may alternatively be used, for example, in factory where the master tapes are written. The servoloop 45, 47, 49, 51, 55, 53 is then not used, and information tracks offset with respect to the average centerline are written. A master tape may be replicated in large numbers and made available to consumers who may read the tape by means of an apparatus in which a periodical displacement of the read spot is not used. It is alternatively possible that the tracks are spaced apart by a constant distance in a pre-recorded tape and that the user reads this tape by means of an apparatus operating with a periodically displaced read spot. If the apparatus according to the invention is used for both writing and reading a tape, it will be necessary to offset the radiation spot by one track period in the read mode with respect to the position of this spot in the write mode. The effects of offset tracks and displaced radiation spot then intensify each other, so that the relative scanning spot-track displacement is doubled. Due to the operation of the servoloop, said condition will automatically be satisfied in practice.

The mirror polygon shown in FIG. 6 may be replaced by a mirror polygon having the same tilt angle for all its facets but one. The remaining facet then has such a different tilt angle that, upon rotation of this facet in the radiation path of the beam, the radiation spot V is displaced on the tape by one track period to the left and thus will scan the previous track. By filtering the low-frequency component from the signal from the detector 45, or the detector 14 in the unit 10, the radiation spot can be correctly positioned before the subsequent, for example five, tracks are scanned. This is particularly attractive during writing, because it can then be ensured that the distance between the written tracks remains constant.

Figure 7:
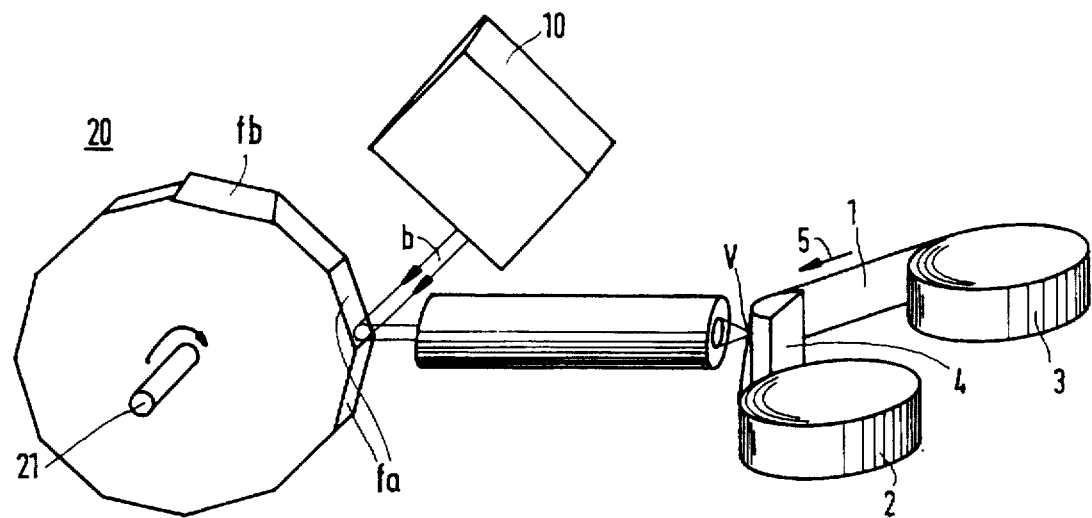
FIG. 7 shows an embodiment of the apparatus including a mirror polygon, one facet of which has a deviating tilt angle.

FIG. 7 shows an embodiment of a tape-scanning apparatus in which such a mirror polygon is used. The facet $f_b$ has a different tilt angle due to the facets $f_a$. The number of facets of the mirror polygon shown in FIG. 7 is larger than six. This may also be the case for the mirror polygon shown in FIG. 6. Moreover, as is also shown in FIG. 7, all facets but one may be parallel to the axis of rotation 21 and thus have a tilt angle of zero degrees, and only the facet $f_b$ has a tilt angle deviating from zero degrees.

Figure 8:
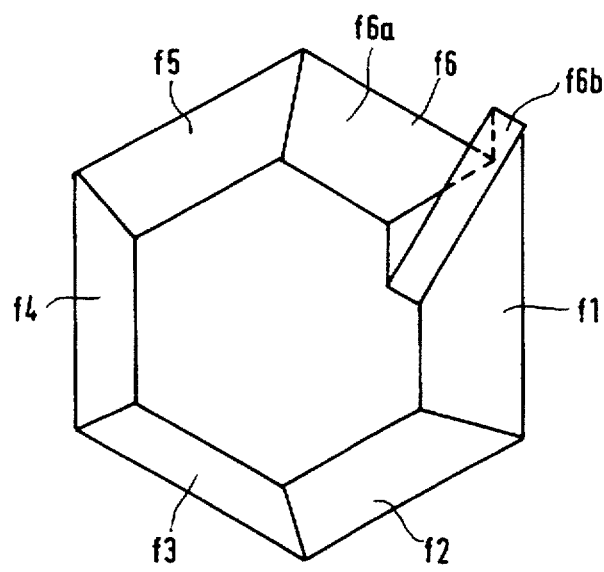
FIG. 8 shows a mirror polygon in which a part of a facet has a deviating tilt angle.

As is shown in FIG. 8, it is alternatively possible to give only a part of said facet a deviating tilt angle. Then the rest of the facet may be used for actual scanning in the track direction.

The mirror polygon shown in a front elevation in FIG. 8 comprises six facets $f_1$–$f_6$, the facets $f_1$–$f_5$ of which have the same tilt angle. The facet $f_6$ is now divided into a part $f_6$ having the same tilt angle as the other facets and a part $f_{6,b}$ having a deviating tilt angle. For the sake of clarity, the deviation has been exaggerated.

As already noted, the apparatus according to the invention may be used for reading a pre-recorded tape-shaped record carrier and for writing and later reading of a blank tape. The information layer of the last-mentioned tape may be a magneto-optical layer, in which case the apparatus should be provided in known manner with magnetic means for local magnetization of the tape so that domains having a direction of magnetization opposed to that of their surroundings are formed in this tape. Moreover, the unit 10 should then be provided in known manner with polarization-sensitive detectors. The tape may be coated with a phase-change layer instead of a magnetic layer, in which phase-change layer information areas are formed by locally varying the structure from amorphous to crystalline, or conversely. In a tape which is only intended to be written one time, the information may alternatively be provided in the form of pits in the information layer, analogously as in the known CD audio disc.

I claim:

1. An optical apparatus for scanning a tape-shaped record carrier intended for reading or recording a structure of optically detectable information areas which are arranged in information tracks extending transversely to the longitudinal direction of the tape, comprising:

a supply reel and a take-up reel for transporting the record carrier in a first direction; and scanning means for supplying a scanning spot for scanning the record carrier in a second direction transverse to the first direction for reading or recording information on the carrier, and to periodically displace a radiation spot in the first direction for generating a tracking signal, and including a rotatable mirror polygon having multiple mirror facets which are arranged around its circumference to provide the scanning movement of the scanning spot.

2. The apparatus of claim 1, in which the mirror facets alternately extend at a first angle and a second angle to the axis of rotation of the mirror polygon, the difference between the first and the second angle being such that the resultant displacement of the scanning spot in the first direction is a fraction of the width of the information tracks.

3. The apparatus of claim 1, in which at least a part of at least one mirror facet extends at such a different angle to the axis of rotation of the mirror polygon than other facets, that the displacement of the radiation spot in the first direction, caused by the angular difference, is approximately equal to a period of the information.

4. The apparatus of claim 3, in which a part of a mirror facet extends at a different angle to the axis of rotation of the mirror polygon than the rest of the mirror facet and other facets.

* * * * *